Aug. 17, 1965  W. BADER  3,200,473
SWIVEL LOCK TOOLHOLDER
Filed June 13, 1963

INVENTOR.
WILLIAM BADER
BY
Barnes, Kisselle, Raisch
& Choate
ATTORNEYS 3,200,473
SWIVEL LOCK TOOLHOLDER
William Bader, Ferndale, Mich., assignor, by mesne assignments, to Fansteel Metallurgical Corporation, Chicago, Ill., a corporation of New York
Filed June 13, 1963, Ser. No. 287,695
5 Claims. (Cl. 29—96)

This invention relates to a toolholder and more particularly to that type of toolholder wherein a throwaway insent or tungsten carbide is utilized, it being an object to provide a holder wherein the insert can be indexed to a number of different positions to avoid regrinding.

Specifically, in connection with the present invention, it is an object to provide a device which is extremely simple in construction and in operation to provide what might be called a low-priced line in the tool field.

It is another object to provide a device which is easily adjusted to accommodate itself to the presence or absence of a chip breaker, for example, or to varying tolerances in a carbide insert.

Other objects and features of the invention relating to details of construction and operation will be apparent in the following description and claims.

Figure 1:
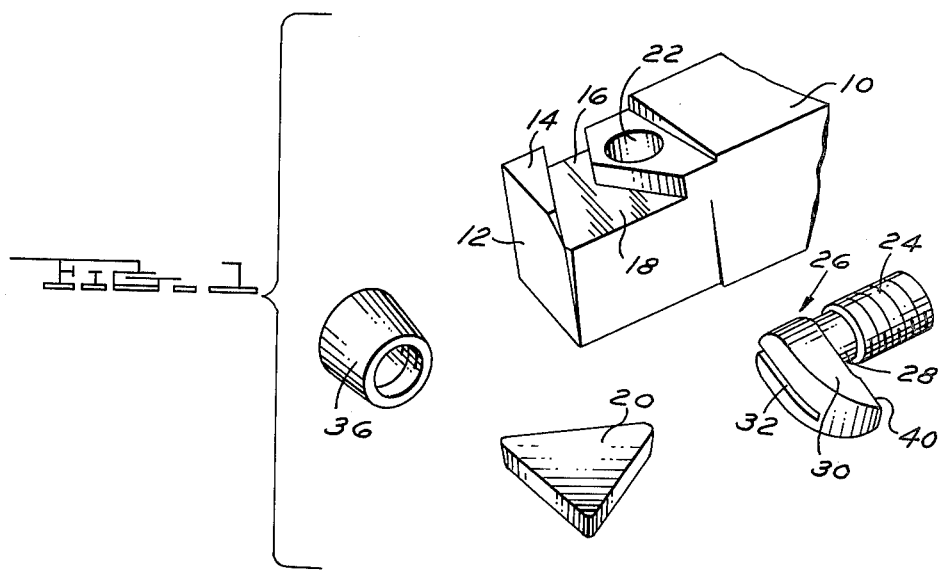

Drawings accompany the disclosure and the various views thereof may be briefly described as:

FIGURE 1, a view of the parts of the device in exploded relationship.

Figures 2, 4:
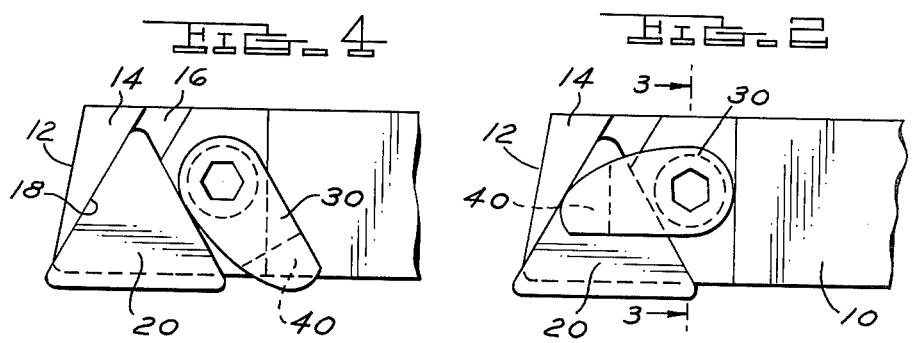

FIGURE 2, a view of the device in assembled position.

Figure 3:
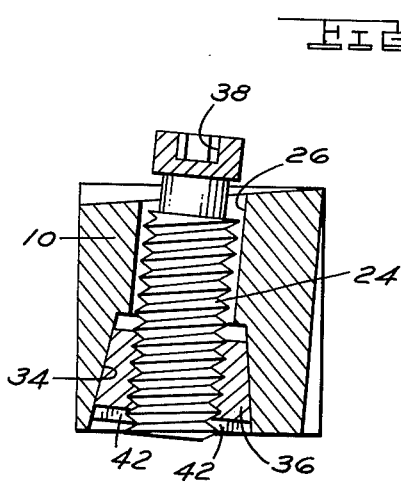

FIGURE 3, a sectional view on line 3—3 of FIGURE 2.

FIGURE 4, a view of the device showing the locking mechanism in release position.

Referring to the drawings:

In FIGURE 1, a tool shank 10 has a suitably angled forward face 12 and a top surface 14 disposed at a proper angle to the shank and the face 12. Face 14 is provided with a milled passage 16 which merges into an insert passage 18 having a suitable supporting surface. Passages or recesses 16 and 18 permit accurate milling of the locating walls of the insert-locating recess. The particular device is shown for a triangular insert 20 and behind the recesses 16 and 18 is an angled cylindrical passage 22 for receiving the threaded cylindrical shank 24 of a clamping mechanism 26 having a reduced neck portion 28 and a top finger portion 30. The finger portion has a slot 32 in which a screwdriver can be inserted to manipulate the finger. Other recesses for circular, square, or specially shaped inserts can be provided.

As shown in FIGURE 3, the opening 22 merges concentrically with a tapered opening 34. This opening 34 has an angle which is called "sticking" taper, that is, just short of a "locking" taper, this latter term being one which is well known in the trade. In actual practice, I have found that an included angle taper of 11° to 12½° will provide a "sticking" taper if the parts have a reamed finish and are formed of steel. For example, the body may be 1095 steel and the cone of oil hardened tool steel or drill rod, each being heat treated. Receivable in this tapered recess 34 is a tapered nut 36 having a smooth outer surface and a threaded internal passage for receiving the threaded shank 24 of a clamping device 26. The assembly is shown in FIGURE 3 where the clamp is shown provided, as an alternative, with a hexagonal recess 38 for use with an Allen wrench.

The opening 26 is sufficiently large that there is slight clearance between the threaded shank 24 and the walls of the recess. The pitch of the threads 24 acting in the tapered nut 36 is such that as the locking or clamping finger 30 is moved from the position shown, for example, in FIGURE 4, to the position shown in FIGURE 2, it will cause the surface 40 to lower and come to bear on the top of the insert 20 lying in the recess 18.

Thus, the device can be easily manipulated from a release position of FIGURE 4 to a locking position of FIGURE 2 by simply swinging it from one position to the other. It will be noted in FIGURE 3 that the cone nut 36 has opposed recesses 42 on opposite sides of the screw shank so that a spanner tool can be used to rotate the nut in its opening. If the locking pressure is not quite great enough or the finger 30 overswings, the device can be readily adjusted by turning up the cone nut 36 slightly so that the swinging action will cause a suitable tightening action on the insert.

Ordinarily, due to the nature of the taper angle on the cone and its receiving recess, the nut 36 is reasonably stable in its position; but it can be moved by the spanner tool as desired when the screw shank 24 is loose. In some cases, it may be desirable to use different thickness inserts for which ready adjustment is possible and, in other cases, it may be desirable to use a chip breaker on top of the insert 20; if this is the case, the finger 30 can be raised easily to accommodate this additional unit by rotation of the nut 36.

I claim:

1. A toolholder for indexable cutting inserts comprising:
   (a) a body having a recess adjacent one edge for receiving an insert, and having a passage therethrough spaced from said recess,
   (b) a conical nut in a conical recess formed at one end of said passage, said nut having a threaded bore, and
   (c) a locking clamp to apply locking pressure to an insert in said recess comprising a shaft to lie in said passage having a threaded surface to co-operate with the threaded bore of said nut and a radial finger on said shaft at the end of said passage opposite to said nut extending over said body swingable to a position overyling said recess and movable vertically downward to a clamping position while simultaneously moving to said overlying position.

2. A toolholder as defined in claim 1 in which said conical nut is movable in said recess to shift said shaft vertically relative to said body.

3. A toolholder as defined in claim 1 in which the angle of the cone of said nut and said recess is sufficiently close to a locking angle to provide a snug fit readily releasable for rotative adjustment.

4. A toolholder for indexable cutting inserts comprising:
   (a) a body having a recess adjacent one edge for receiving an insert, and having a passage therethrough spaced from said recess,
   (b) means in said passage forming threads comprising a nut having a threaded bore, the outer walls thereof being related to interengage axially and rotate to form an anchor for a threaded shaft, and
   (c) a locking clamp to apply locking pressure to an insert in said recess comprising a shaft to lie in said passage having a threaded surface to co-operate with said means in said passage and a radial finger affixed to said shaft outside said body and normally arranged to rotate said shaft when moved about the axis of said shaft, said finger extending over said body swingable to a position overyling said recess and movable vertically downward to a clamping position while simultaneously moving to said overlying position.

5. A toolholder for indexable cutting inserts comprising:

(a) a body having a recess adjacent one edge for receiving an insert and having a passage therein spaced from said recess.

(b) a locking clamp to apply locking pressure to an insert in said recess comprising a shaft to lie in said passage having a threaded surface within said passage and a radial finger on said shaft outside said body extending over said body swingable to a position overlying said recess and movable vertically downward to a clamping position while simultaneously moving to said overlying position, and (c) means in said passage having internal threads to co-operate with the threaded surface of said shaft and related to said recess wherein the outer walls thereof are shaped to interengage axially with said recess and to rotate relative to said recess upon manual manipulation to after axial relationship to said shaft whereby to form an anchor for said shaft.

References Cited by the Examiner

UNITED STATES PATENTS 2,848,789   8/58   Friedline _____ 29—96

WILLIAM W. DYER, JR., *Primary Examiner.*